US012074761B1

(12) United States Patent
Rajendran (10) Patent No.: US 12,074,761 B1
(45) Date of Patent: Aug. 27, 2024

(54) SYSTEM AND METHOD TO REDUCE INTERRUPTIONS IN A NETWORK

(71) Applicant: DISH Wireless L.L.C., Englewood, CO (US)

(72) Inventor: Karupaiah Rajendran, Sachse, TX (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

(21) Appl. No.: 18/483,334

(22) Filed: Oct. 9, 2023

(51) Int. Cl.
| *H04W 28/06* | (2009.01) |
| *H04L 41/0816* | (2022.01) |
| *H04L 41/0853* | (2022.01) |
| *H04W 36/08* | (2009.01) |
| *H04W 76/14* | (2018.01) |
| *H04W 76/19* | (2018.01) |
| H04L 41/0803 | (2022.01) |
| H04L 43/0852 | (2022.01) |

(52) U.S. Cl.
CPC ...... *H04L 41/0816* (2013.01); *H04L 41/0856* (2013.01); *H04W 76/14* (2018.02); *H04W 76/19* (2018.02)

(58) Field of Classification Search
CPC ............. H04L 41/0816; H04L 41/0856; H04L 41/0803; H04L 43/0852; H04W 76/19; H04W 76/14; H04W 28/06; H04W 36/08; H04W 36/00

USPC ........................................................ 709/220
See application file for complete search history.

(56) References Cited

U.S. PATENT DOCUMENTS

| 11,641,307 B2 * | 5/2023 | Boucadair ............... H04L 45/42 709/220 |
| 2022/0030062 A1 * | 1/2022 | Jennings ............. H04L 41/0886 |
| 2022/0053369 A1 * | 2/2022 | Zhang ................... H04W 28/06 |
| 2023/0229319 A1 * | 7/2023 | Klein .................... G06F 3/0619 711/113 |

* cited by examiner

*Primary Examiner* — Jude Jean Gilles
(74) *Attorney, Agent, or Firm* — Baker Botts L.L.P (57) ABSTRACT

An apparatus comprises a memory and a processor communicatively coupled to one another. The memory may be configured to store multiple configuration commands. The processor may be configured to establish a communication session between a first network component and a second network component based at least in part upon the configuration commands. Further, the processor may be configured to determine whether the communication session between the first network component and the second network component is interrupted, generate multiple space backup configuration commands indicating to back up the configuration commands to a space server in response to determining that the communication session is interrupted, transfer the space backup configuration commands to the space server, and reestablish the communication session between the first network component and the second network component via the space server based at least in part upon the space backup configuration commands.

20 Claims, 3 Drawing Sheets

SYSTEM AND METHOD TO REDUCE INTERRUPTIONS IN A NETWORK

TECHNICAL FIELD

The present disclosure relates generally to recover communication operations in a network, and more specifically to a system and method to reduce interruptions in the network.

BACKGROUND

In some wireless communications systems, a cell site is a set of equipment configured to receive and transmit radio signals for cellular voice and data transmission in a network. The cell site may be configured to communicate with one or more user devices. Communication in the network may be interrupted due to power outages or wireline cuts in a case of a natural disaster near the cell site. In particular, interruptions to the cell site may cause the network to be unavailable for routing communications between the user devices. Further, interruptions to the cell site may cause existing communications between user devices to be dropped by the network.

SUMMARY OF THE DISCLOSURE

In one or more embodiments, the system and method disclosed herein reduce interruptions in a network. In this regard, the system and method described herein provide several practical applications and technical advantages that overcome current technical problems in wireless communication technology. In particular, the system and the method are integrated into multiple practical applications improving speed, quality, and reliability of wireless communications systems. The system and method may provide a smart mechanism to recover critical sites to help the affected people via wireless system. In some embodiments, wireless communication systems comprise one or more network components configured to perform specific Network Functions (NFs) in a network. The network may comprise a Service-Based Architecture (SBA). Further, each network component may be configured to perform multiple communication transmissions across the network in accordance with routing and configuration information provided by a specific network component communicating in a transfer network.

In some embodiments, the system and method provide reliable solutions to reduce or prevent communication interruptions to the network when one or more cell sites (e.g., base station or terminal) undergo interruptions. As a result, the speed, quality, and reliability of wireless communications systems are improved by reducing, preventing, or eliminating periods of downtime for the entire network. For example, in the event of an interruption in which specific network components in the cell site lose at least partial connection to the network, the system and the method recover communication operations in the network. In this regard, the system and method enable the specific network components to restore communication sessions across the network via a space server.

In one or more embodiments, the space server comprises one or more space components configured to back up configuration commands in space. The space components may be satellites orbiting the Earth configured to establish a connection with specific network components. The space server may be configured to back up the configuration commands from a cell site on Earth upon determining an interruption in a network comprising the cell site. In some embodiments, a server operating the cell site may be configured to back up the configuration commands to the space server and transform operations performed at the cell site.

In addition, the system and method described herein are integrated into a technical advantage of increasing processing speeds in a computer system, because processors associated with the system and the method comprise a machine learning algorithm that actively generate insights for any cell sites. In the machine learning algorithm, the system and method may parse historical communication operations performed at the cell site and exiting cell site resources to determine a transformation or a modification to the cell site. In some embodiments, the system and the method may modify communication operations at the cell site upon detecting an interruption to a communication session established via the cell site. As the machine learning algorithm is trained to account for many of the situations and conditions occurring in the cell site, multiple modifications or transformations may be implemented preemptively to prevent or reduce interruptions in the network. As a result, processing speed during communication operations is improved because the system and method comprise actively allocate cell site resources to prevent or reduce interruptions in the network. For example, the machine learning algorithm may suggest backing up configuration commands to the space server for a cell site determined to lose wireline connectivity during severe storms or flowing season.

In one or more embodiments, the system and the method may be performed by an apparatus, such as a server, communicatively coupled to multiple network components in a core network, one or more base stations in a radio access network, and one or more user equipment. Further, the system may be a wireless communication system, which comprises the apparatus. In addition, the system and the method may be performed as part of a process performed by the apparatus communicatively coupled to the network components in the core network. As a non-limiting example, the apparatus may comprise a memory and a processor communicatively coupled to one another. The memory may be configured to store multiple configuration commands and one or more communication profiles comprising one or more entitlements associated with a specific communication session. Each configuration command may indicate one or more connection requirements to establish one or more communication sessions between two or more network components of the network components. The processor may be configured to establish a communication session between a first network component and a second network component based at least in part upon the configuration commands. The communication session may be associated with a communication profile. Further, the processor is configured to determine multiple entitlements associated with the communication profile. The entitlements may indicate to back up the configuration commands upon detecting an interruption in the communication session. The processor may be configured to determine whether the communication session between the first network component and the second network component is interrupted, generate multiple space backup configuration commands indicating to back up the configuration commands to a space server in response to determining that the communication session is interrupted, transfer the space backup configuration commands to the space server, and reestablish the communication session between the first network component and the second network component via the space server based at least in part upon the space backup configuration commands.

Certain embodiments of this disclosure may comprise some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
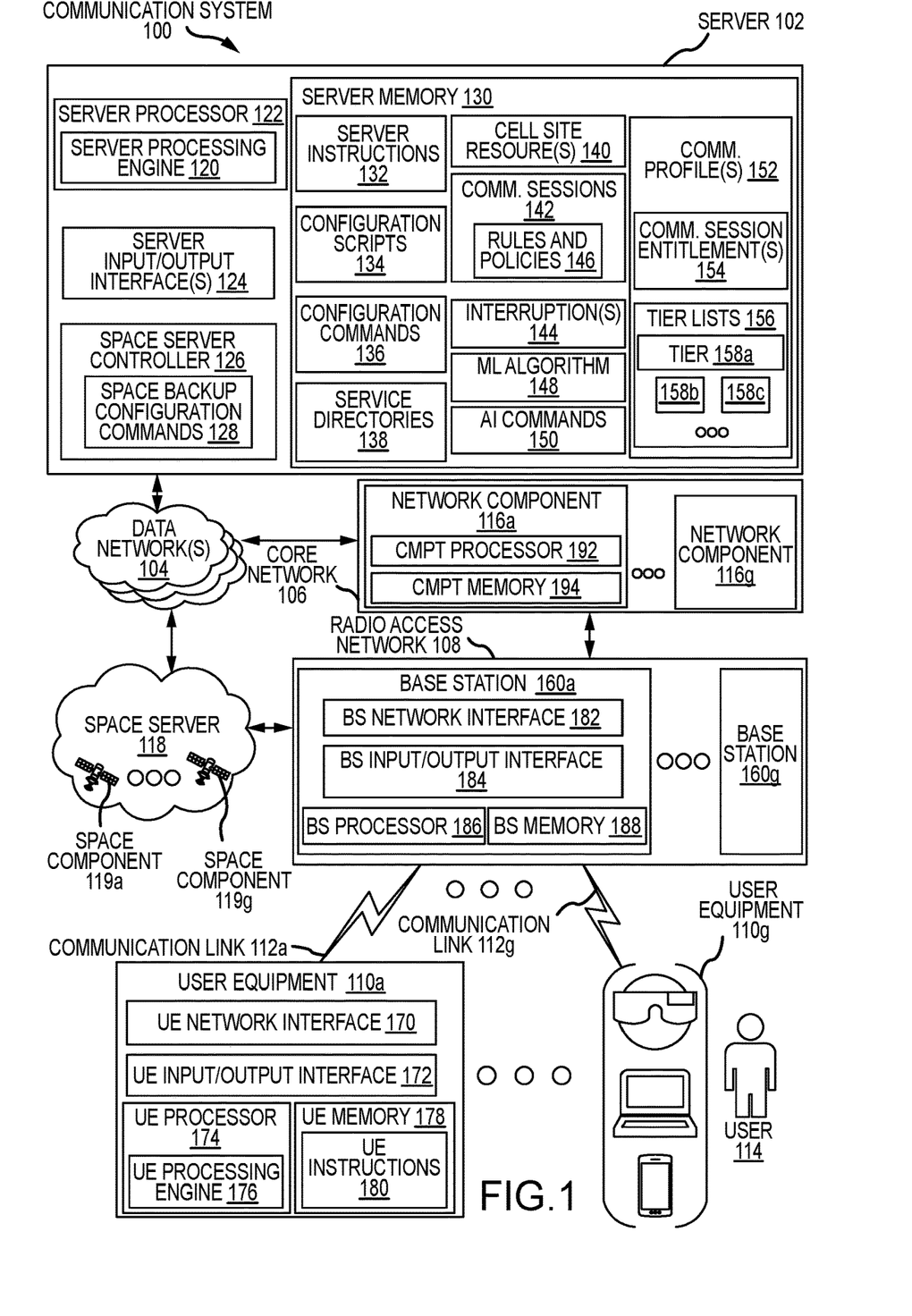
FIG. 1 illustrates an example communication system in accordance with one or more embodiments.
Figure 2:
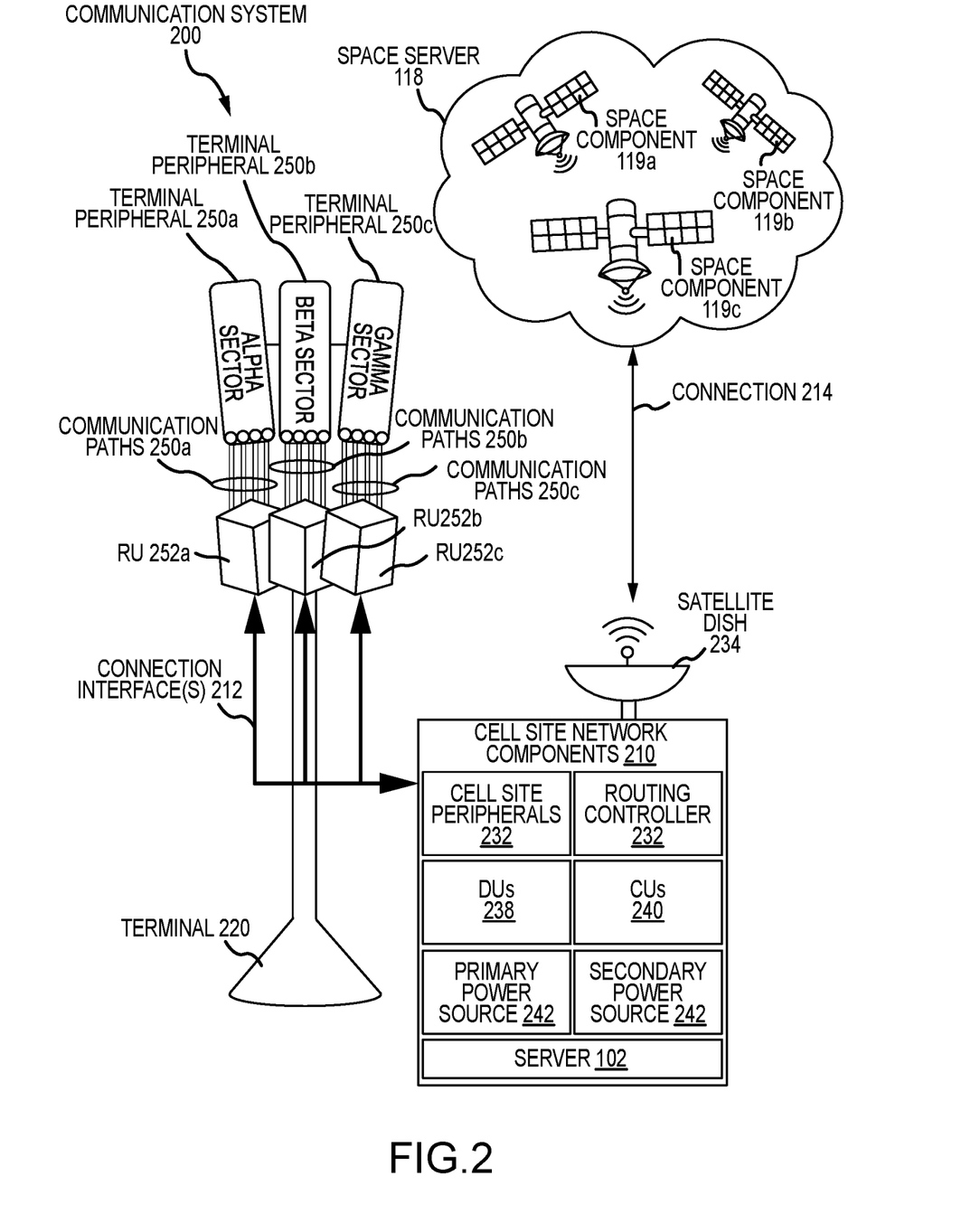
FIG. 2 illustrates examples of one or more communication operations performed in conjunction with the example communication system of FIG. 1.
Figure 3:
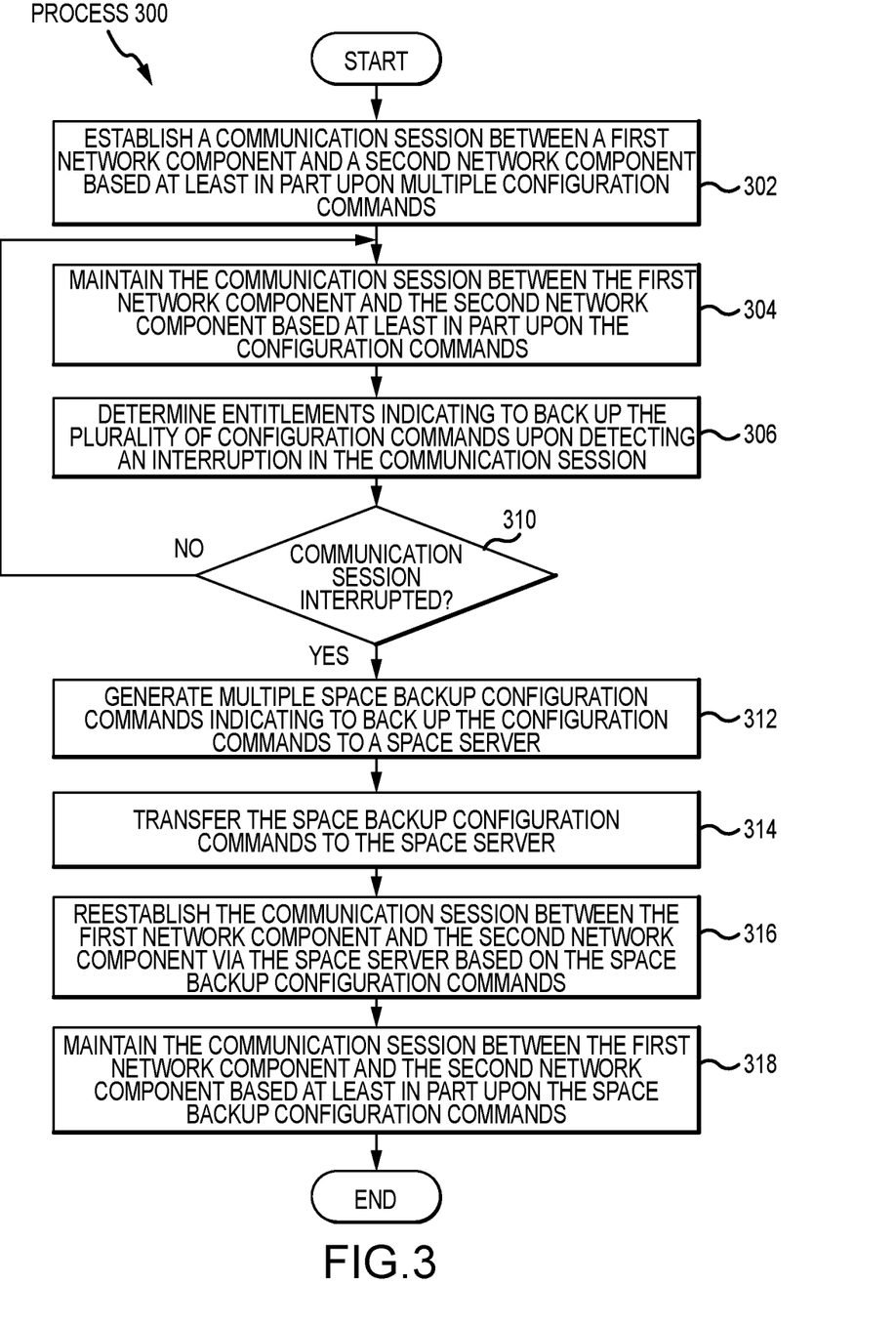
FIG. 3 illustrates an example flowchart of a method to reduce interruptions in a transfer network in conjunction with the communication operations of FIG. 2.

In one or more embodiments, a cell site is a set of equipment configured to receive and transmit radio signals for cellular voice and data transmission. The cell site may be configured to communicate with one or more network components. Communication in the cell site may be interrupted due to power outages or wireline cuts in a case of a natural disaster near the cell site. Interruptions may cause the cell site to be unavailable for routing communications between the network components. Further, interruptions may cause existing communications between network components to be dropped by the cell site. As described above, this disclosure provides various systems and methods to reduce interruptions in a transfer network. FIG. 1 illustrates a communication system 100 in which a server 102 performs one or more operations to reduce downtime in communications with one or more data networks 104 and/or a core network 106. FIG. 2 illustrates communication operations 200 performed by the communication system 100 of FIG. 1. FIG. 3 illustrates a process 300 performed by the communication system 100 of FIG. 1.

Communication System Overview

FIG. 1 illustrates a diagram of a communication system 100 (e.g., a wireless communication system) that comprises a server 102 configured to reduce interruptions in one or more data networks 104, a core network 106, and/or a radio access network (RAN) 108, in accordance with one or more embodiments. In the communication system 100 of FIG. 1, the server 102 may be communicatively coupled to the one or more data networks 104, the core network 106, and the RAN 108. In FIG. 1, the server 102 is communicatively coupled to multiple user equipment 110a-110g (collectively, user equipment 110) via the RAN 108 and multiple corresponding communication links 112a-112g (collectively, communication links 112) established between each user equipment 110 and the RAN 108. As represented by a user equipment 110g, the user equipment 110 may be operated or attended to by one or more users 114. In the example of FIG. 1, the server 102 may be communicatively coupled to multiple additional devices in the communication system 100. While FIG. 1 shows the server 102 connected directly to the one or more data networks 104, the server 102 may be located inside the core network 106 as part of one or more of the network components (e.g., any of the network components 116a-116g) in the core network 106.

In one or more embodiments, the communication system 100 comprises a space server 118 comprising multiple space components 119a-119e (collectively, space components 119), the user equipment 110a-110g (collectively, user equipment 110), the RAN 108, the core network 106, the one or more data networks 104, and the server 102. In some embodiments, the communication system 100 may comprise a Fifth Generation (5G) mobile network or wireless communication system, utilizing high frequency bands (e.g., 24 Gigahertz (GHz), 39 GHz, and the like) or lower frequency bands such (e.g., frequency range FR1 Sub 6 GHZ-less than 7.125 GHZ). In this regard, the communication system 100 may comprise a large number of antennas. In some embodiments, the communication system may perform one or more communication operations associated with 5G New Radio (NR) protocols described in reference to the Third Generation Partnership Project (3GPP). As part of the 5G NR protocols, the communication system 100 may perform one or more millimeter (mm) wave technology operations to improve bandwidth or latency in wireless communications.

In some embodiments, the communication system 100 may be configured to partially or completely enable communications via one or more various radio access technologies (RATs), wireless communication technologies, or telecommunication standards, such as Global System for Mobiles (GSM) (e.g., Second Generation (2G) mobile networks), Universal Mobile Telecommunications System (UMTS) (e.g., Third Generation (3G) mobile networks), Long Term Evolution (LTE) of mobile networks, LTE-Advanced (LTE-A) mobile networks, 5G NR mobile networks, or Sixth Generation (6G) mobile networks.

Communication System Components

Server

The server 102 is generally any device or apparatus that is configured to process data, communicate with the space server 118, the data networks 104, the one or more network components 116a-116g (collectively, network components 116) in the core network 106, the RAN 108, and the user equipment 110. The server 102 may be configured to monitor, track data, control routing of signal, and control operations of certain electronic components in the communication system 100, associated databases, associated systems, and the like, via one or more interfaces. The server 102 is generally configured to oversee operations of the server processing engine 120. The operations of the server processing engine 120 are described further below. In some embodiments, the server 102 comprises a server processor 122, one or more server Input (I)/Output (O) interfaces 124, a space server controller 126 configured to generate one or more space backup configuration commands 128, and a server memory 130 communicatively coupled to one another. The server 102 may be configured as shown, or in any other configuration. In some embodiments, the server 102 may be located in one of the network components 116 located in the core network 106 and may be configured to perform one or more network functions (NFs) associated with the network components 116. In some embodiments, the server 102 may be located in one of the base stations 160 located in the RAN 108 and may be configured to perform one or more communication operations 200 described in reference to the base station 160a of FIG. 2.

The server processor 122 may comprise one or more processors operably coupled to and in signal communication with the one or more server I/O interfaces 124, the space server controller 126, and the server memory 130. The server processor 122 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The server processor 122 may be a programmable logic device, a microcontroller, a microprocessor, or any suitable combination of the preceding. The one or more processors in the server processor 122 are configured to process data and may be implemented in hardware or software executed by hardware. For example, the server processor 122 may be an 8-bit, a 16-bit, a 32-bit, a 64-bit, or any other suitable architecture. The server processor 122 may comprise an arithmetic logic unit (ALU) to perform arithmetic and logic operations, processor registers that supply operands to the ALU, and store the results of ALU operations, and a control unit that fetches software instructions such as server instructions 132 from the server memory 130 and executes the server instructions 132 by directing the coordinated operations of the ALU, registers and other components via the server processing engine 120. The server processor 122 may be configured to execute various instructions. For example, the server processor 122 may be configured to execute the server instructions 132 to perform functions or perform operations disclosed herein, such as some or all of those described with respect to FIGS. 1-3. In some embodiments, the functions described herein are implemented using logic units, FPGAs, ASICs, DSPs, or any other suitable hardware or electronic circuitry.

In one or more embodiments, the server I/O interfaces 124 may be hardware configured to perform one or more communication operations 200 described in reference to FIG. 2. The server I/O interfaces 124 may comprise one or more antennas as part of a transceiver, a receiver, or a transmitter for communicating using one or more wireless communication protocols or technologies. In some embodiments, the server I/O interfaces 124 may be configured to communicate using, for example, NR or LTE using at least some shared radio components. In other embodiments, the server I/O interfaces 124 may be configured to communicate using single or shared radio frequency (RF) bands. The RF bands may be coupled to a single antenna, or may be coupled to multiple antennas (e.g., for a multiple-input multiple output (MIMO) configuration) to perform wireless communications. The server I/O interfaces 124 may be configured to comprise one or more peripherals such as a network interface, one or more administrator interfaces, and one or more displays.

The server network interfaces that may be part of the server I/O interfaces 124 may be any suitable hardware or software (e.g., executed by hardware) to facilitate any suitable type of communication in wireless or wired connections. These connections may comprise, but not be limited to, all or a portion of network connections coupled to additional network components 116 in the core network 106, the RAN 108, the user equipment 110, the Internet, an Intranet, a private network, a public network, a peer-to-peer network, the public switched telephone network, a cellular network, a local area network (LAN), a metropolitan area network (MAN), a wide area network (WAN), and a satellite network. The server network interface may be configured to support any suitable type of communication protocol.

The one or more administrator interfaces that may be part of the server I/O interfaces 124 may be user interfaces configured to provide access and control to of the server 102 to one or more users (e.g., the user 114) or electronic devices. The one or more users may access the server memory 130 upon confirming one or more access credentials to demonstrate that access or control to the server 102 may be modified. In some embodiments, the one or more administrator interfaces may be configured to provide hardware and software resources to the one or more users. Examples of user devices comprise, but are not limited to, a laptop, a computer, a smartphone, a tablet, a smart device, an Internet-of-Things (IOT) device, a simulated reality device, an augmented reality device, or any other suitable type of device. The administrator interfaces may enable access to one or more graphical user interfaces (GUIs) via an image generator display (e.g., one or more displays), a touchscreen, a touchpad, multiple keys, multiple buttons, a mouse, or any other suitable type of hardware that allow users to view data or to provide inputs into the server 102. The server 102 may be configured to allow users to send requests to one or more user equipment 110.

In the example of FIG. 1, the one or more displays that may be part of the server I/O interfaces 124 may be configured to display a two-dimensional (2D) or three-dimensional (3D) representation of a service. Examples of the representations may comprise, but are not limited to, a graphical or simulated representation of an application, diagram, tables, or any other suitable type of data information or representation. In some embodiments, the one or more displays may be configured to present visual information to one or more users (not shown). The one or more displays may be configured to present visual information to the one or more users updated in real-time. The one or more displays may be a wearable optical display (e.g., glasses or a head-mounted display (HMD)) configured to reflect projected images and enable user to see through the one or more displays. For example, the one or more displays may comprise display units, one or more lenses, one or more semi-transparent mirrors embedded in an eye glass structure, a visor structure, or a helmet structure. Examples of display units comprise, but are not limited to, a cathode ray tube (CRT) display, a liquid crystal display (LCD), a liquid crystal on silicon (LCOS) display, a light emitting diode (LED) display, an organic LED (OLED) display, an active-matrix OLED (AMOLED) display, a projector display, or any other suitable type of display. In another embodiment, the one or more displays are a graphical display on the server 102. For example, the graphical display may be a tablet display or a smartphone display configured to display the data representations.

In some embodiments, the space server controller 126 may be any combination of a baseband processor, analog RF signal processing circuitry (e.g., including filters, mixers, oscillators, amplifiers, and the like), or digital processing circuitry (e.g., for digital modulation as well as other digital processing). For example, the space server controller 126 may be configured to allocate power, frequency, and sensing resources to the space server 118 as described during wireless communication operations 200 described in reference to FIG. 2. In some embodiments, the space server controller 126 may be configured to generate one or more space backup configuration commands 128 to be stored and executed by the space server 118.

The server memory 130 may be volatile or non-volatile and may comprise a read-only memory (ROM), random-access memory (RAM), ternary content-addressable memory (TCAM), dynamic random-access memory (DRAM), and static random-access memory (SRAM). The server memory 130 may be implemented using one or more disks, tape drives, solid-state drives, and/or the like. The server memory 130 is operable to store the server instructions 132, one or more configuration scripts 134, one or more existing configuration commands 136, one or more service directories 138, one or more cell site resources 140, one or more communication sessions 142 comprising a record of interruptions 144 and one or more rules and policies 146, a machine learning algorithm 148, multiple artificial intelligence commands 150, and one or more communication profiles 152 comprising one or more communication session entitlements 154 and one or more tier lists 156 comprising multiple distribution tiers 158A-158C (collectively, tiers 158). In the server memory 130, the server instructions 132 may comprise commands and controls for operating communications between the network components 116, the space components 119, and the base stations 160 when executed by the server processing engine 120 of the server processor 122.

In some embodiments, the server memory 130 is a storage repository configured to store large amount of structured, semi-structured, and unstructured data. In some embodiments, the server memory 130 is configured to store every type of data in its native format without fixed limits. The server memory 130 may be updated periodically or dynamically (e.g., updated in real-time). In some embodiments, the server memory 130 may be located in the server 102 or located at a remote location different from a location of the server 102. The server memory 130 may be configured to store one or more of the space backup configuration commands 128 in a corresponding raw format preselected in accordance with the one or more rules or policies 146.

In one or more embodiments, the one or more configuration scripts 134 are configured to instruct one or more network components 116 in the core network 106 to implement one or more configuration commands 136 or one of the space backup configuration commands 128 to establish the one or more communication sessions 142. The one or more configuration scripts 134 enable automation of the routing and configuration of network components 116 in the core network 106. In this regard, the one or more configuration scripts 134 may reconfigure multiple cloud-NFs (CNFs) that establish initial communication sessions with at least one NRF in a communication path comprising one or more additional network components 116. In this regard, the one or more configuration scripts 134 instruct routing and configuration of communication procedures based on static routing commands to restore restores services in the core network 106.

In one or more embodiments, the configuration commands 136 are configured to establish the one or more communication sessions 142 between the base stations 160 in the RAN 108, the space components 119 in the space server 118, the network components 116 in the core network 106, and/or the user equipment 110. Each configuration command of the configuration commands 136 may be configured to provide control information to perform one or more of the communication operations 200 described in FIG. 2. Further, the configuration commands 136 may be routing and configuration information for reinstating or reestablishing the communication sessions 142. The configuration commands 136 may be dynamically or periodically updated from the network components 116 in the core network 106. In one or more embodiments, the space backup configuration commands 128 are configured to establish one or more communication sessions 142 between the base stations 160 in the RAN 108, the space components 119 in the space server 118, the network components 116 in the core network 106, and/or the user equipment 110. Each configuration command of the space backup configuration commands 128 may be configured to provide control information to establish one or more of the communication sessions 142. Further, the space backup configuration commands 128 may be routing and configuration information for reinstating or reestablishing the communication sessions 142. The space backup configuration commands 128 may be dynamically or periodically updated from the network components 116 in the core network 106. In some embodiments, the space backup configuration commands 128 may comprise possible updates to the existing configuration commands 136.

In some embodiments, the server 102 may attempt to reinstate a specific communication session 142 based at least in part upon the space backup configuration commands 128 in response to losing a specific communication session 142 established with the configuration commands 136. The space backup configuration commands 128 may be dynamically or periodically updated from one of the network components 116 in the core network 106. Herein, the communication sessions 142 may refer to communication signals exchanged between the server 102, additional network components 116 in the core network 106, one or more of the space component 119 in the space server 118, and one or more base stations 160 in the RAN 108. In some embodiments, the space backup configuration commands 128 are provided to the server 102 from another of the network components 116 performing a specific NF.

The service directories 138 may be configured to store service-specific information and/or user-specific information. The service directories 138 may enable the server 102 to confirm user credentials to access one or more network components (e.g., one of the network components 116 configured to perform one or more NFs in the core network 106). The service directories 138 may be configured to store provider-specific information. The service directories 138 may enable the server 102 to validate credentials associated with a specific provider (e.g., one of the CNFs) against corresponding user-specific information in the service directories 138.

The cell site resources 140 comprises allocation information and/or commands to modify operations at a base station (e.g., a cell site) in the RAN 108. The cell site resources 140 may comprise power resources associated with a power supply, processing resources associated with a processor, and/or memory resources associated with a memory. In one or more embodiments, the cell site resources 140 may be dynamically enabled at any given base station 160 to modify routing operations of communication sessions 142. The cell site resources 140 may be modified at the given base station 160 to prioritize assigning resources to maintain certain communication sessions 142. For example, the processing resources may be reassigned at a base station 160 from one communication session 142 to another communication session 142. In some embodiments, the cell site resources 140 may be modified in response to detecting a change or modification caused for a specific type of resource. For example, the cell site resources 140 may be reassigned to prioritize communication sessions 142 between emergency organizations in a predefined area. In this example, a first number of the cell site resources 140 assigned to a first communication session 142 may be dynamically reduced by an amount while a second number of the cell site resources 140 may be dynamically increased by the same amount.

The communication sessions 142 may be operations performed by the server 102. The communication sessions 142 may be any communication link, signaling exchange, or connection established any two devices or components in the communication system 100. The communication sessions 142 may be established in accordance with the rules and policies 146. The communication sessions 142 may be established based on one or more configuration commands 136 and/or one or more of the space backup configuration commands 128. The communication sessions 142 may be maintained in accordance with the one or more configuration commands 136 and/or one or more of the space backup configuration commands 128 over a predefined period of time. The communication sessions 142 may be maintained in accordance with the one or more configuration commands 136 and/or one or more of the space backup configuration commands 128 over a dynamically modified period of time.

The rules and policies 146 may be security configuration commands or regulatory operations predefined by an organization or one or more users 114. In one or more embodiments, the rules and policies 146 may be dynamically defined by the one or more users 114. The rules and policies 146 may be prioritization rules configured to regulate data signaling or control signaling of the communication session 142. The one or more rules and policies 146 may be predetermined or dynamically assigned by a corresponding user 114 or an organization associated with the user 114.

The interruptions 144 may be a change or modification in connectivity between two network components 116. The interruptions 144 may be a break in signaling between any two network components 116. In some embodiments, a given communication session 142 between a first network component 116 (e.g., the network component 116a) and a second network component 116 (e.g., the network component 116b) may be interrupted by one or more changes caused to a wireline (e.g., wired) connection at a given cell site (e.g., one of the base stations 160). In other embodiments, the communication session 142 between the first network component 116a and the second network component 116b may be interrupted by one or more changes caused to a microwave (e.g., wireless) connection at the given cell site. The communication system 100 may be configured to reduce, prevent, or eliminate the interruptions 144 in the communication sessions 142 by reactively or proactively migrating transport network operations for the communication sessions 142.

In one or more embodiments, the machine learning algorithm 148 may be configured to convert data stored by the server memory 130 to generate structured data for further analysis. Further, the machine learning algorithm 148 may be configured to interpret and transform the server instructions 132 into structured data sets and subsequently stored as files or tables. The machine learning algorithm 148 may cleanse, normalize raw data collected by the server I/O interfaces 124, and derive intermediate data to generate uniform data in terms of encoding, format, and data types. The machine learning algorithm 148 may be executed to run user queries and advanced analytical tools on the structured data. The machine learning algorithm 148 may be configured to generate the one or more artificial intelligence commands 150 based on the configuration commands 136. In turn, the space server controller 126 may be configured to generate the space backup configuration commands 128 based on the outputs of the machine learning algorithm 148. The artificial intelligence commands 150 may be parameters that modify routing of resources in communication sessions to be allocated in the communication network. The artificial intelligence commands 150 may be combined with the existing configuration commands 136 to create the space backup configuration commands 128. The artificial intelligence commands 150 may be parameters configured to improve connectivity of network components 116 or base stations 160 by reducing or preventing the interruptions 144. In one or more embodiments, the server 102 may back up communication sessions 142 in accordance with a corresponding tier 158 of the communication profile 152. For example, in the case of a natural disaster, communication sessions 142 performed by an organization In some embodiments, the communication profiles 152 may comprise the communication session entitlements 154 and the tier lists 156. The communication profiles 152 may comprise information related to control and operations of the communication sessions 142. In this regard, one communication profile 152 may be associated with one or more communication session 142. Further, one or more communication profile 152 may be associated with one or more communication sessions 142. The communication session entitlements 154 may be configured to provide one or more connectivity allowances (e.g., access) between the server 102, the user equipment 110, the base stations 160, the space components 119, and one or more of the network components 116. The communication session entitlements 154 may be assigned to specific departments or tenants in an organization. The communication session entitlements 154 may be predefined or dynamically defined in accordance with the rules and policies 146. The tier lists 156 comprise one or more priority levels for each of the communication sessions 142. In one or more embodiments, the server 102 and/or the space server 118 may be configured to control, monitor, and regulate the communication sessions in accordance with one or more of the tier lists 156. The tier lists 156 may be modified over time such that new tier lists 156 may be added or removed, as-needed dynamically or periodically. The tier lists 156 may be modified immediately upon a triggering event caused by an admin console access. The tier lists 156 may be modified periodically upon entering a triggering event during a maintenance window. In some embodiments, the server 102 may dynamically manage spectra for all three tiers 158 with first priority for user equipment 110 in a first tier 158A, second priority for user equipment 110 in a second tier 158B, and third for user equipment 110 in a third tier 158C. In some embodiments, to use the spectrum, the server 102 may use the communication profiles 152 to assign one or more resources (e.g., cell site resources 140) and deploy corresponding access points. For example, one of the user equipment 110 may request use of spectrum channels via a connection request. In turn, the server 102 (e.g., acting as at least a part of an administrator) may receive connectivity data in the request indicating latitude, longitude, and height into a database (e.g., the server memory 130). In some embodiments, the server 102 may determine whether the requested spectrum is available. The server 102 may then assign spectrum channels and grant authority to operate in the channels in accordance with a priority level (e.g., depending on the tiers 158). In this regard, the server 102 may authorize allocation of appropriate transmission power levels and allocation of channel resources.

User Equipment

In one or more embodiments, each of the user equipment 110 (e.g., the user equipment 110a and a user equipment 110g representative of the user equipment 110a-110g) may be any computing device configured to communicate with other devices, such as the server 102, the space components 119, the space server 118, other network components 116 in the core network 106, databases, and the like in the communication system 100. Each of the user equipment 110 may be configured to perform specific functions described herein and interact with one or more network components 116 in the core network 106 via one or more base stations 160. Examples of user equipment 110 comprise, but are not limited to, a laptop, a computer, a smartphone, a tablet, a smart device, an IoT device, a simulated reality device, an augmented reality device, or any other suitable type of device.

In one or more embodiments, referring to the user equipment 110a as a non-limiting example of the user equipment 110, the user equipment 110a may comprise a user equipment (UE) network interface 170, a UE I/O interface 172, a UE processor 174 configured to execute a UE processing engine 176, and a UE memory 178 comprising one or more UE instructions 180. The UE network interface 170 may be any suitable hardware or software (e.g., executed by hardware) to facilitate any suitable type of communication in wireless or wired connections. These connections may comprise, but not be limited to, all or a portion of network connections coupled to additional network components 116 in the core network 106, the space server 118, the RAN 108, the Internet, an Intranet, a private network, a public network, a peer-to-peer network, the public switched telephone network, a cellular network, a local area network (LAN), a metropolitan area network (MAN), a wide area network (WAN), and a satellite network. The UE network interface 170 may be configured to support any suitable type of communication protocol.

The UE I/O interface 172 may be hardware configured to perform one or more communication operations 200 described in reference to FIG. 2. The UE I/O interface 172 may comprise one or more antennas as part of a transceiver, a receiver, or a transmitter for communicating using one or more wireless communication protocols or technologies. In some embodiments, the UE I/O interface 172 may be configured to communicate using, for example, 5G NR or LTE using at least some shared radio components. In other embodiments, the UE I/O interface 172 may be configured to communicate using single or shared RF bands. The RF bands may be coupled to a single antenna, or may be coupled to multiple antennas (e.g., for a MIMO configuration) to perform wireless communications. In some embodiments, the user equipment 110a may comprise capabilities for voice communication, mobile broadband services (e.g., video streaming, navigation, and the like), or other types of applications. In this regard, the UE I/O interface 172 of the user equipment 110a may communicate using machine-to-machine (M2M) communication, such as machine-type communication (MTC), or another type of M2M communication.

In some embodiments, the user equipment 110a is communicatively coupled to one or more of the base stations 160 via one or more communication links 112 (e.g., the communication link 112a and the communication link 112g representative of the communication links 112a-112g). The user equipment 110a may be a device with cellular communication capability such as a mobile phone, a hand-held device, a computer, a laptop, a tablet, a smart watch or other wearable device, or virtually any type of wireless device. In some applications, the user equipment 110 may be referred to as a UE, UE device, or terminal.

The UE processor 174 may comprise one or more processors operably coupled to and in signal communication with the UE network interface 170, the UE I/O interface 172, and the UE memory 178. The UE processor 174 is any electronic circuitry, including, but not limited to, state machines, one or more CPU chips, logic units, cores (e.g., a multi-core processor), FPGAs, ASICs, or DSPs. The UE processor 174 may be a programmable logic device, a microcontroller, a microprocessor, or any suitable combination of the preceding. The one or more processors in the UE processor 174 are configured to process data and may be implemented in hardware or software executed by hardware. For example, the UE processor 174 may be an 8-bit, a 16-bit, a 32-bit, a 64-bit, or any other suitable architecture. The UE processor 174 comprises an ALU to perform arithmetic and logic operations, processor registers that supply operands to the ALU, and store the results of ALU operations, and a control unit that fetches software instructions such as the UE instructions 180 from the UE memory 178 and executes the UE instructions 180 by directing the coordinated operations of the ALU, registers, and other components via the UE processing engine 176. The UE processor 174 may be configured to execute various instructions. For example, the UE processor 174 may be configured to execute the UE instructions 180 to implement functions or perform operations disclosed herein, such as some or all of those described with respect to FIGS. 1-3. In some embodiments, the functions described herein are implemented using logic units, FPGAs, ASICs, DSPs, or any other suitable hardware or electronic circuitry.

Radio Access Network

In one or more embodiments, the RAN 108 enables the user equipment 110 to access one or more services in the core network 106 and/or the space server 118. The one or more services may be a mobile telephone service, a Short Message Service (SMS) message service, a Multimedia Message Service (MMS) message service, an Internet access, cloud computing, or other types of data services. The RAN 108 may comprise the base stations 160 in signal communication with the user equipment 110 via the one or more communication links 112. Each of the base stations 160 may service the user equipment 110. In some embodiments, while multiple base stations 160 are shown connected to multiple user equipment 110 via the communication link 112, one or more additional base stations 160 may be connected to one or more additional user equipment 110 via one or more additional communication links 112. For example, the base station 160a-110g may exchange connectivity signals with the user equipment 110a via the communication link 112a. In another example, the base station 160g may exchange connectivity signals with the user equipment 110g via the communication link 112g. In yet another example, the base stations 160 may service some user equipment 110 located within a geographic area serviced by one of the base stations 160.

In one or more embodiments, referring to the base station 160a as a non-limiting example of the base station 160, the base station 160a may comprise a base station (BS) network interface 182, a BS I/O interface 184, a BS processor 186, and a BS memory 188. The BS network interface 182 may be any suitable hardware or software (e.g., executed by hardware) to facilitate any suitable type of communication in wireless or wired connections between the core network 106 and the user equipment 110. These connections may comprise, but not be limited to, all or a portion of network connections coupled to additional network components 116 in the core network 106, other base stations 160, the user equipment 110, the Internet, an Intranet, a private network, a public network, a peer-to-peer network, the public switched telephone network, a cellular network, a LAN, a MAN, a WAN, and a satellite network. The BS network interface 182 may be configured to support any suitable type of communication protocol.

The BS I/O interface 184 may be hardware configured to perform one or more communication operations 200 described in reference to FIG. 2. The BS I/O interface 184 may comprise one or more antennas as part of a transceiver, a receiver, or a transmitter for communicating using one or more wireless communication protocols or technologies. In some embodiments, the BS I/O interface 184 may be configured to communicate using, for example, 5G NR or LTE using at least some shared radio components. In other embodiments, the BS I/O interface 184 may be configured to communicate using single or shared RF bands. The RF bands may be coupled to a single antenna, or may be coupled to multiple antennas (e.g., for a MIMO configuration) to perform wireless communications. In some embodiments, the base station 160A may allocate resources in accordance with one or more routing and configuration operations obtained from the core network 106. In some embodiments, resources may be allocated to enable capabilities in the user equipment 110 for voice communication, mobile broadband services (e.g., video streaming, navigation, and the like), or other types of applications.

In some embodiments, the base station 160*a* is communicatively coupled to one or more of the user equipment 110 via the one or more communication links 112. In some applications, the base stations 160*a* may be referred to as BS, evolved Node B (eNodeB or eNB), a next generation Node B, gNodeB, gNB, or terminal.

The BS processor 186 may comprise one or more processors operably coupled to and in signal communication with the BS network interface 182, the BS I/O interface 184, and the BS memory 188. The BS processor 186 is any electronic circuitry, including, but not limited to, state machines, one or more CPU chips, logic units, cores (e.g., a multi-core processor), FPGAs, ASICs, or DSPs. The BS processor 186 may be a programmable logic device, a microcontroller, a microprocessor, or any suitable combination of the preceding. The one or more processors in the BS processor 186 are configured to process data and may be implemented in hardware or software executed by hardware. For example, the BS processor 186 may be an 8-bit, a 16-bit, a 32-bit, a 64-bit, or any other suitable architecture. The BS processor 186 comprises an ALU to perform arithmetic and logic operations, processor registers that supply operands to the ALU, and store the results of ALU operations, and a control unit that fetches software instructions (not shown) from the BS memory 188 and executes the software instructions by directing the coordinated operations of the ALU, registers, and other components via a processing engine (not shown) in the BS processor 186. The BS processor 186 may be configured to execute various instructions. For example, the BS processor 186 may be configured to execute the software instructions to implement functions or perform operations disclosed herein, such as some or all of those described with respect to FIGS. 1-3. In some embodiments, the functions described herein are implemented using logic units, FPGAs, ASICs, DSPs, or any other suitable hardware or electronic circuitry.

Core Network

The core network 106 may be a network configured to manage communication sessions for the user equipment 110. In one or more embodiments, the core network 106 may establish connections between user equipment 110 and a particular data network 104 in accordance with one or more communication protocols. In the example of FIG. 1, the core network 106 comprises one or more network components configured to perform one or more NFs. In some embodiments, the core network 106 enables the user equipment 110 to communicate with the server 102, or another type of device, located in a particular data network 104 or in signal communication with a particular data network 104. The core network 106 may implement a communication method that does not require the establishment of a specific communication protocol connection between the user equipment 110 and one or more of the data networks 104. The core network 106 may include one or more types of network components.

In some embodiments, the core network 106 may include a 5G NR or an LTE access network (e.g., an evolved packet core (EPC) network) among others. In this regards, the core network 106 may comprise one or more logical networks implemented via wireless connections or wired connections. Each logical network may comprise an end-to-end virtual network with dedicated power, storage, or computation resources. Each logical network may be configured to perform a specific application comprising individual policies, rules, or priorities. Further, each logical network may be associated with a particular Quality of Service (QoS) class, type of service, or particular user associated with one or more of the user equipment 110. For example, a logical network may be a Mobile Private Network (MPN) configured for a particular organization. In this example, when the user equipment 110A is configured and activated by a wireless network associated with the RAN 108, the user equipment 110*a* may be configured to connect to one or more particular network slices (i.e., logical networks) in the core network 106. Any logical networks or slices that may be configured for the user equipment 110*a* may be configured using a network component (e.g., one of the network components 116 (e.g., the network component 116*a* and the network component 116*g* representing the network component 116*a*-116*g*) of FIG. 1.

In one or more embodiments, each of the network components 116 may comprise a component processor 192 configured to perform one or more similar operations to those described in reference to the BS processor 186 and the UE processor 174. In other embodiments, each of the network components 116 may comprise a component memory 194 configured to perform one or more similar operations to those described in reference to the BS memory 188 and the UE memory 178.

Data Networks

In the example system 100 of FIG. 1, the data networks 104 may facilitate communication within the communication system 100. This disclosure contemplates that the data networks 104 may be any suitable network operable to facilitate communication between the server 102, the space server 118, the core network 106, the RAN 108, and the user equipment 110. The data networks 104 may comprise one or more transport networks that include any interconnecting system capable of transmitting audio, video, signals, data, messages, or any combination of the preceding. The data networks 104 may include all or a portion of a LAN, a WAN, an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, and the like), a Long Term Evolution (LTE) network, a Universal Mobile Telecommunications System (UMTS) network, a peer-to-peer (P2P) network, a Bluetooth network, a Near Field Communication network, a Zigbee network, or any other suitable network, operable to facilitate communication between the components of the communication system 100. In other embodiments, the communication system 100 may not have all of these components or may comprise other elements instead of, or in addition to, those above.

Space Server

In the example system 100 of FIG. 1, the space server 118 comprises one or more of the space components 119. In some embodiments, the space components 119 (e.g., the space component 119a and the space component 119g representative of the space component 119) are communicatively coupled to one or more of the base stations 160. The space components 119 may be configured to perform some or all of the operations described in relation to one or more of the network components 116 or one or more of the base stations 160. For example, the space component 119a may comprise a space component processor performing one or more of the operations described in reference to the component processor 192 and/or a space component memory performing one or more of the operations described in reference to the component memory 194. The space server 118 may comprise one or more of the space components 119 shown in FIG. 1.

In one or more embodiments, the space server 118 is configured to modify one or more operations of the data networks 104. The operations may comprise changes r modifications to a transport process in the data networks 104. The transport process may comprise one or more operations described in reference to TS 38.211 and/or TS 38.212 of the 3GPP standards. In some embodiments, the space server 118 may be configured to regulate or modify a transport layer shared between the space server 118, the server 102, the data networks 104, the core network 106, the RAN 108, and/or the user equipment 110. In some embodiments, the space server 118 is located in at least one space component 119 orbiting the Earth. The space components 119 may be configured to operate in low orbits, medium orbits, and/or geostationary orbits. In one or more embodiments, the space server 118 is configured to perform one or more of the operations described in reference to the server 102. For example, the space server 118 may be configured to allocate one or more of the cell site resources 140. The space server 118 and the server 102 may be configured to control and modify spectrum channels and transport channels in the communication system 100. The transport channels may be intermediate channel between logical channels and physical channels. The spectrum channel may be configured to allocate communication transmissions at different bandwidths in a spectrum.

The space components 119 may configured to operate in low orbits as a low Earth orbit (LEO) satellite with an orbit around Earth with a period of 128 minutes or less (e.g., making at least 11.25 orbits per day) and an eccentricity (e.g., deviation of a curve or orbit from circularity) less than 0.25. The space components 119 may configured to operate in medium orbits as a medium Earth orbit (MEO) satellite with an Earth-centered orbit with an altitude above a low Earth orbit (LEO) and below a high Earth orbit (HEO). The orbit may be between 2,000 Kilometers and 35,786 Kilometers (e.g., about 1,243 miles and 22,236 miles) above sea level. The space components 119 operating as the MEO may comprise an orbital period of equal or greater than 2 hours and less than 24 hours. The space components 119 may configured to operate in geostationary orbits as a geostationary (GEO) satellite is an Earth-orbit placed at an altitude of approximately 22,300 miles or 35,800 kilometers directly above the equator. In this regard, the space components 119 may be configured to revolve in a same direction the Earth rotates (e.g., west to cast).

In one or more embodiments, one or more of the space components 119 may appear nearly stationary in the sky to a ground-based observer. These space components 119 may complete one orbit in about 24 hours, which is the same amount of time it takes for the Earth to rotate once on its axis and/or moving in sync with the Earth's rotation. The space components 119 may be configured to receive, amplify, and retransmit radio signals to and from the Earth.

Communication Operations

FIG. 2 illustrates one or more communication operations 200 in accordance with one or more embodiments. The communication operations 200 may be performed by the server 102 and/or the space server 118. In the non-limiting example of FIG. 2, the communication operations 200 may be performed by the server 102 and/or the space server 118. In the example of FIG. 2, the server 102 is located in one or more cell site network components 210 in signal communication (e.g., the one or more connection interfaces 212) with a terminal 220 (e.g., the base station 160a) and in signal communication (e.g., connection 214) with one or more of the space components 119 the space server 118. As a non-limiting example, the space server 118 of FIG. 2 comprises the space component 119a, a space component 119b, and a space component 119c. The cell site network components 210 may comprise one or more cell site peripherals 232 (e.g., the satellite dish 234), a routing controller 236, at least one distributed unit (DU) 238, at least one control unit (CU) 240, at least one primary power source 242, and at least one secondary power source 244. The terminal 220 may comprise one or more terminal peripherals 250a-250c (collectively, terminal peripherals 250), one or more communication paths 252a-252c (collectively, communication paths 252), and one or more radio units (RUS) 254a-254c (collectively, RUs 254).

The cell site peripherals 232 may be configured to perform one or more of the operations described in reference to the server I/O interfaces 124, the BS network interface 182, and/or the UE network interface 170. The routing controller 236 may be configured to perform one or more transmission operations, data exchange operations, and/or one or more routing operations in the communication system 100. The routing controller 236 may be configured to establish the communication sessions 142 as described in reference to FIG. 1.

In some embodiments, the terminal 220 (e.g., the base station 160a, the cell site, or gNB) is mainly split into three parts namely the RUs 254, the DUs 238, and the CUs 240. The RUs 254 are radio hardware entities that convert radio signals sent to and from antennas into digital signals for transmission over a packet network. The RUs 254 handle a digital front end (DFE) and a lower physical (PHY) layer. The DUs 238 may be hardware and software executed by hardware that is deployed on site in communication with the server 102. The DUs 328 may be deployed close to the RUs 254 on the cell site and provides support for the lower layers of the protocol stack such as the radio link control (RLC), medium access control (MAC), and parts of the PHY layer. The CUs 240 may be hardware and software executed by hardware configured to provide support for the higher layers of the protocol stack such as the service data adaptation protocol (SDAP), packet data convergence protocol (PDCP), and radio resource control (RRC). In one or more embodiments, the server 102 and/or the space server 118 may be configured to perform regular health checks at the cell site to check performance of the DUs 238 and RUs 254 associated with the cell site.

In one or more embodiments, the server 102 may be configured to modify communication operations 200 comprising the RUs 254. In particular, the server 102 may be configured to reduce, increase, or maintain a number of active RUs 254 at any given time. For example, in conjunction with establishing the communication session 142 between the first network component 116a and the second network component 116b based at least in part upon the plurality of configuration commands 136, the server 102 may be configured to perform one or more DU operations by the DUs 238. Further, in conjunction with reestablishing the communication session 142 between the first network component 116a and the second network component 116b via the space server 118 based at least in part upon the space backup configuration commands 128, the server 102 may be configured to perform the one or more DU operations by the DUs 238 and one or more CU operations by the CUS 240. In one or more embodiments, one or more network components 116 in the RAN 108 may be configured to transform from perform DU functions and/or operations to performing a combination of DU and CU functions and/or operations.

The primary power source 242 and/or the secondary power source 244 may be hardware configured to supply power to the cell site network components 210 and the terminal 220. The primary power source 242 may be configured to be a primary power assistance to the cell site network components 210 or the terminal 220. The primary power source 242 and/or the secondary power source 244 may be configured to provide power directly from a grid (e.g., a microgrid, a local grid, or a regional grid). The primary power source 242 and/or the secondary power source 244 may be configured to receive, regulate, modulate, and/or control power to the cell site network components 210 and the terminal 220. The primary power source 242 and/or the secondary power source 244 may be configured to operate as a backup power source such as a generator transforming energy of a first type to energy (e.g., gas) of a second type of energy (e.g., electrical). In some embodiments, the server 102 is configured to determine whether communication sessions 142 between the first network component 116a and the second network component 116b is interrupted based at least in part upon a loss of connectivity with the primary power source 242. In response to determining that the communication session 142 is interrupted based at least in part upon the loss of connectivity with the primary power source 242, the server 102 may be configured to transition power consumption from the primary power source 242 to the secondary power source 242.

In one or more embodiments, the communication operations 200 comprise smart site recovery operations and/or intelligent site transformation operations during transport and/or power outage due to disaster or unforeseen events. The terminal 220 may be one of the base stations 160 comprising a wireline transport connection or a microwave transport connection. The server 102 may be configured to provide radio coverage in an affected zone in an event that the terminal 220 is disconnected from the transport network. For example, whenever a wireline transport network is interrupted (e.g., an interruption 144 causes any of the data networks 104 to be down in) by adverse events (e.g., natural disaster such as a cyclone, a blizzard, a tornado, and the like), the server 102 may be configured to cause the cell site to provide radio coverage in an affected zone impacted by the interruption 144.

The server 102 may be configured to intelligently identify potential cell sites comprising configuration commands 136 to back up into the space server 118 as backup configuration commands 128. In these cases, the server 102 may switch communication sessions 142 from the configuration commands 136 to the space backup configuration commands 128 before, during, or after an interruption 144 is detected. The server 102 may be configured to prevent or reduce negative impacts of the interruptions 144 by switching the cell site's transport from a first connectivity (e.g., wireline such as fiber optics, cables, microwave connections, another backup wireless network comprising a security protocol, other possible Alternate Secure Wireless connectivity, and the like) to satellite communications in a systematic approach with transport network, core connectivity, and configuration transformation to cater communication needs efficiently. As described above, the communication session 142 may be interrupted by one or more changes caused to a wireline connection at the cell site. Further, the communication session 142 may be interrupted by one or more changes caused to a microwave connection at the cell site. The connection 214 may be a wireless communication established between the cell site network components 210 and the space server 118. In this regard, the space server 118 may be communicatively coupled to the terminal 220.

In the example of FIG. 2, the terminal peripherals 250 comprise a terminal peripheral 250a, a terminal peripheral 250b, and a terminal peripheral 250c. In some embodiments, the terminal peripherals 250 may comprise less or more terminal peripherals 250 than those shown in FIG. 2. The server 102 may be configured to modify a number of the terminal peripherals 250 that are available to perform a communication session 142 upon transitioning communication operations from the configuration commands 136 to the space backup configuration commands 128.

For example, in conjunction with establishing the communication session 142 between the first network component 116a and the second network component 116b based at least in part upon the plurality of configuration commands 136, the server 102 may be configured to assign access to a first terminal peripheral 250a and a second terminal peripheral 250b. Further, in conjunction with reestablishing the communication session 142 between the first network component 116a and the second network component 116b via the space server 118 based at least in part upon the plurality of space backup configuration commands 128, the server 102 may be configured to assign access to the first terminal peripheral 250a and do not assign access to the second terminal peripheral 250b.

Further, the terminal peripherals may be MIMO antennas configured to be one or more sectors configured to communicate with a massive number of components or devices. The terminal peripherals 250a-250c may be an alpha sector, a beta sector, and a gamma sector, respectively. In one or more embodiments, the terminal 220 may comprise less or more sectors than those shown in FIG. 2. In one or more embodiments, the operations of the server 102 may be replaced by operations performed by the space server 118 in a situation in which the server 102 is unavailable to assist in the operations of the terminal 220.

In some embodiments, the server 102 and/or the space server 118 may be configured to reduce, increase, or maintain a number of terminal peripherals 250 available for the communication operations 200 at any given time. Further, the server 102 and/or the space server 118 may be configured to move communication sessions 142 from a first terminal peripheral 250a to a second terminal peripheral 250b. In other embodiments, the server and/or the space server 118 may be configured to reduce, increase, or maintain a number of communication paths 252 available for the communication operations 200 at any given time. For example, as part of modifying the cell site resources 140, the server 102 and/or the space server 118 may be configured to transition a number of communication paths 252a from four available communication paths 252a to two available communication paths 252a.

In FIG. 2, the communication paths 252 comprise communication paths 252a in association with the terminal peripheral 250a, communication paths 252b in association with the terminal peripheral 250b, and communication paths 252c in association with the terminal peripheral 250c. In some embodiments, in conjunction with establishing the communication session 142 between the first network component 116a and the second network component 116b based at least in part upon the configuration commands 136, the server 102 may be configured to assign a first number of communication paths 252a enabled for the RU 254a in the cell site. Further, in conjunction with reestablishing the communication session 142 between the first network component 116a and the second network component 116b via the space server 118 based at least in part upon the space backup configuration commands 128, assign a second number of communication paths 252a enabled for the RU 254a. In these examples, the first number of communication paths 252a may be less than or greater than the second number of communication paths 252a.

The connection interfaces 212 may be one or more interfaces configured to exchange data and/or controls between the RUs 254 and the cell site network components 210. The connection interfaces 212 may be configured to follow an evolved common public radio interface (eCPRI) protocol. The eCPRI protocol may be configure the connection interfaces 212 as fronthaul transport network eCPRI interfaces corresponding to each of the RUs 254 and/or the corresponding terminal peripherals 250. The connection 214 may be a wireless communication link between the cell site network components 210 and the space server 118.

In some embodiments, the space server 118 and/or the server 102 may be configured to determine whether the interruption 144 that caused the communication session 142 to be interrupted is resolved. In response to determining that the interruption 144 is resolved, the space server 118 and/or the server 102 may be configured to reestablish the communication session 142 between the first network component 116a and the second network component 116b based at least in part upon the plurality of configuration commands 136. In some embodiments, the space backup configuration commands 128 may be used as a basis to update and/or generate new configuration commands 136 in the server 102. The space backup configuration commands 128 may be removed from the space server 118 upon determining that the terminal 220 is back online.

Example Process to Reduce Interruptions in a Network

FIG. 3 illustrate respective example flowchart of the process 300, in accordance with one or more embodiments. Modifications, additions, or omissions may be made to the process 300. The process 300 may include more, fewer, or other operations than those shown above. For example, operations may be performed in parallel or in any suitable order. While at times discussed as the server 102, one or more of the network components 116, one or more of the base stations 160, the one or more space components 119, components of any of thereof, or any suitable system or components of the communication system 100 may perform one or more operations of the process 300. For example, one or more operations of the process 300 may be implemented, at least in part, in the form of server instructions 132 of FIG. 1, stored on non-transitory, tangible, machine-readable media (e.g., server memory 130 of FIG. 1 operating as a non-transitory computer readable medium) that when run by one or more processors (e.g., the server processor 122 of FIG. 1) may cause the one or more processors to perform operations described in operations 302-318.

The process 300 starts at operation 302, where the server 102 establishes a communication session 142 between a first network component 116a and a second network component 116b based at least in part upon multiple configuration commands 136. The communication session 142 may be associated with a communication profile 152. At operation 304, the server 102 maintains the communication session 142 between the first network component 116a and the second network component 116b based at least in part upon the configuration commands 136. The server 102 may allocate one or more cell site resources 140 to support and/or maintain a robustness of the communication session 142. At operation 306, the server 102 is configured to determine communication session entitlements 154 indicating to back up the plurality of configuration commands 136 upon detecting an interruption 144 in the communication session 142. As described above, the communication session entitlements 154 indicate to back up the configuration commands 136 upon detecting the interruption 144 in the communication session 142.

The process 300 continues at operation 310, where the server 102 may determine whether the communication session is interrupted. In this regard, the server 102 may determine whether the communication session 142 was interrupted. The server 102 may determine that an interruption 144 has occurred if the server 102 fails to receive an acknowledgement that a transmission was exchanged between the first network component 116a and the second network component 116b. The server 102 may be configured to immediately determine that the interruption 144 occurred based at least in part upon detecting a break in a connection with a specific cell site. If the server 102 determines that the communication session 142 is not interrupted (i.e., NO), the process 300 returns to operation 304. In this case, at operation 304, the server 102 maintains the communication session 142 between the first network component 116a and the second network component 116b based on the configuration commands 136. In response, if the server 102 determines that the communication session 142 is interrupted (i.e., YES), the process 300 proceeds to operation 312. In this case, at operation 312, the server 102 is configured to generate multiple space backup configuration commands 128 indicating to back up the configuration commands 136 to a space server 118.

In this case, the process 300 may conclude at operations 314-318, where the server 102 is configured to at least partially perform one or more of the communication operations 200 including the space server 118 in FIG. 2. At operation 314, the server 102 is configured to transfer the space backup configuration commands 128 to the space server 118. At operation 316, the server 102 reestablishes the communication session 142 between the first network component 116a and the second network component 116b via the space server 118 based on the space backup configuration commands 128. At operation 318, the server 102 maintains the communication session 142 between the first network component 116a and the second network component 116b based on the space backup configuration commands 128.

SCOPE OF THE DISCLOSURE

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An apparatus in a cell site communicatively coupled to a plurality of network components, comprising:
   a memory configured to store:
      a plurality of configuration commands, each configuration command indicating one or more connection requirements to establish one or more communication sessions between two or more network components of the plurality of network components; and
      one or more communication profiles comprising one or more entitlements associated with a specific communication session; and
   a processor communicatively coupled to the memory and configured to:
      establish a communication session between a first network component and a second network component based at least in part upon the plurality of configuration commands, the communication session being associated with a communication profile;
      determine a plurality of entitlements associated with the communication profile, the plurality of entitlements indicating to back up the plurality of configuration commands upon detecting an interruption in the communication session;
      determine whether the communication session between the first network component and the second network component is interrupted;
      in response to determining that the communication session is interrupted, generate a plurality of space backup configuration commands indicating to back up the plurality of configuration commands to a space server;
      transfer the plurality of space backup configuration commands to the space server; and
      reestablish the communication session between the first network component and the second network component via the space server based at least in part upon the plurality of space backup configuration commands.

2. The apparatus of claim 1, wherein the processor is further configured to:
   determine whether the interruption that caused the communication session to be interrupted is resolved;
   in response to determining that the interruption is resolved, reestablish the communication session between the first network component and the second network component based at least in part upon the plurality of configuration commands; and
   cause the plurality of space backup configuration commands to be removed from the space server.

3. The apparatus of claim 1, wherein the processor is further configured to:
   in conjunction with establishing the communication session between the first network component and the second network component based at least in part upon the plurality of configuration commands, perform one or more distributed unit (DU) operations; and
   in conjunction with reestablishing the communication session between the first network component and the second network component via the space server based at least in part upon the plurality of space backup configuration commands, perform the one or more DU operations and one or more control unit (CU) operations.

4. The apparatus of claim 1, wherein the processor is further configured to:
   determine whether the communication session between the first network component and the second network component is interrupted based at least in part upon a loss of connectivity with a primary power source; and
   in response to determining that the communication session is interrupted based at least in part upon the loss of connectivity with the primary power source, transition power consumption from the primary power source to a secondary power source.

5. The apparatus of claim 1, wherein the processor is further configured to:
   in conjunction with establishing the communication session between the first network component and the second network component based at least in part upon the plurality of configuration commands, assign a first number of communication paths enabled for a radio unit (RU) in the cell site; and
   in conjunction with reestablishing the communication session between the first network component and the second network component via the space server based at least in part upon the plurality of space backup configuration commands, assign a second number of communication paths enabled for the RU, wherein the first number of communication paths is greater than the second number of communication paths.

6. The apparatus of claim 1, wherein the processor is further configured to:
   in conjunction with establishing the communication session between the first network component and the second network component based at least in part upon the plurality of configuration commands, assign access to a first terminal peripheral and a second terminal peripheral; and
   in conjunction with reestablishing the communication session between the first network component and the second network component via the space server based at least in part upon the plurality of space backup configuration commands, assign access to the first terminal peripheral and do not assign access to the second terminal peripheral.

7. The apparatus of claim 1, wherein the processor is further configured to:
in conjunction with establishing the communication session between the first network component and the second network component based at least in part upon the plurality of configuration commands, assign access to a first communication bandwidth; and
in conjunction with reestablishing the communication session between the first network component and the second network component via the space server based at least in part upon the plurality of space backup configuration commands, assign access to a first communication bandwidth, wherein the first communication bandwidth is greater than the second communication bandwidth.

8. The apparatus of claim 1, wherein the space server is located in at least one space component orbiting the Earth.

9. The apparatus of claim 1, wherein the communication session between the first network component and the second network component is interrupted by one or more changes caused to a wireline connection at the cell site.

10. The apparatus of claim 1, wherein the communication session between the first network component and the second network component is interrupted by one or more changes caused to a microwave connection at the cell site.

11. A method, comprising:
establishing a communication session between a first network component and a second network component based at least in part upon a plurality of configuration commands, wherein:
each configuration command indicates one or more connection requirements to establish one or more communication sessions between two or more network components of the plurality of network components; and
the communication session is associated with a communication profile;
determining a plurality of entitlements associated with the communication profile, the plurality of entitlements indicating to back up the plurality of configuration commands upon detecting an interruption in the communication session;
determining whether the communication session between the first network component and the second network component is interrupted;
in response to determining that the communication session is interrupted, generating a plurality of space backup configuration commands indicating to back up the plurality of configuration commands to a space server;
transferring the plurality of space backup configuration commands to the space server; and
reestablishing the communication session between the first network component and the second network component via the space server based at least in part upon the plurality of space backup configuration commands.

12. The method of claim 11, further comprising:
determining whether the interruption that caused the communication session to be interrupted is resolved;
in response to determining that the interruption is resolved, reestablishing the communication session between the first network component and the second network component based at least in part upon the plurality of configuration commands; and
causing the plurality of space backup configuration commands to be removed from the space server.

13. The method of claim 11, further comprising:
in conjunction with establishing the communication session between the first network component and the second network component based at least in part upon the plurality of configuration commands, performing one or more distributed unit (DU) operations; and
in conjunction with reestablishing the communication session between the first network component and the second network component via the space server based at least in part upon the plurality of space backup configuration commands, performing the one or more DU operations and one or more control unit (CU) operations.

14. The method of claim 11, further comprising:
determining whether the communication session between the first network component and the second network component is interrupted based at least in part upon a loss of connectivity with a primary power source; and
in response to determining that the communication session is interrupted based at least in part upon the loss of connectivity with the primary power source, transitioning power consumption from the primary power source to a secondary power source.

15. The method of claim 11, wherein the communication session between the first network component and the second network component is interrupted by one or more changes caused to a wireline connection at a cell site.

16. A non-transitory computer readable medium storing instructions that when executed by a processor cause the processor to:
establish a communication session between a first network component and a second network component based at least in part upon a plurality of configuration commands, wherein:
each configuration command indicates one or more connection requirements to establish one or more communication sessions between two or more network components of the plurality of network components; and
the communication session is associated with a communication profile;
determine a plurality of entitlements associated with the communication profile, the plurality of entitlements indicating to back up the plurality of configuration commands upon detecting an interruption in the communication session;
determine whether the communication session between the first network component and the second network component is interrupted;
in response to determining that the communication session is interrupted, generate a plurality of space backup configuration commands indicating to back up the plurality of configuration commands to a space server;
transfer the plurality of space backup configuration commands to the space server; and
reestablish the communication session between the first network component and the second network component via the space server based at least in part upon the plurality of space backup configuration commands.

17. The non-transitory computer readable medium of claim 16, wherein the processor is further caused to:
determine whether the interruption that caused the communication session to be interrupted is resolved;
in response to determining that the interruption is resolved, reestablish the communication session between the first network component and the second network component based at least in part upon the plurality of configuration commands; and cause the plurality of space backup configuration commands to be removed from the space server.

18. The non-transitory computer readable medium of claim 16, wherein the processor is further caused to:
   in conjunction with establishing the communication session between the first network component and the second network component based at least in part upon the plurality of configuration commands, perform one or more distributed unit (DU) operations; and
   in conjunction with reestablishing the communication session between the first network component and the second network component via the space server based at least in part upon the plurality of space backup configuration commands, perform the one or more DU operations and one or more control unit (CU) operations.

19. The non-transitory computer readable medium of claim 16, wherein the processor is further caused to:
   determine whether the communication session between the first network component and the second network component is interrupted based at least in part upon a loss of connectivity with a primary power source; and
   in response to determining that the communication session is interrupted based at least in part upon the loss of connectivity with the primary power source, transition power consumption from the primary power source to a secondary power source.

20. The non-transitory computer readable medium of claim 16, wherein the communication session between the first network component and the second network component is interrupted by one or more changes caused to a wireline connection at a cell site.

* * * * *